(12) United States Patent
Sugano

(10) Patent No.: US 6,656,069 B2
(45) Date of Patent: Dec. 2, 2003

(54) TRANSMISSION UNIT

(75) Inventor: Taku Sugano, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 09/785,454

(22) Filed: Feb. 20, 2001

(65) Prior Publication Data
US 2001/0024994 A1 Sep. 27, 2001

(30) Foreign Application Priority Data

Mar. 22, 2000 (JP) ........................................ 2000-079553

(51) Int. Cl.⁷ ............................................... F16H 61/00
(52) U.S. Cl. ........................................ 474/28; 74/606 R
(58) Field of Search .............................. 474/28; 477/5, 477/157; 475/5, 159; 74/606 R

(56) References Cited

U.S. PATENT DOCUMENTS 5,746,677 A * 5/1998 Wakahara et al. ............ 477/35

6,039,666 A 3/2000 Okuda et al. ................. 475/72

FOREIGN PATENT DOCUMENTS

| JP | 9-329228 | 12/1997 |
|---|---|---|
| JP | 10-205606 | 8/1998 |

* cited by examiner

Primary Examiner—Thomas R. Hannon
Assistant Examiner—Vicky A. Johnson
(74) Attorney, Agent, or Firm—Foley & Lardner

(57) ABSTRACT

A transmission unit includes a transmission mechanism and a hydraulic control valve unit for controlling the transmission mechanism. The hydraulic control valve unit is disposed at a plane parallel to an axis of the transmission mechanism. A housing encloses the transmission mechanism and has a depressed portion which is overlapped with the hydraulic control unit installed to the housing. An electric oil pump is disposed on the depressed portion of the housing so that a part of the hydraulic control valve unit is overlapped with a part of the electric oil pump.

15 Claims, 9 Drawing Sheets

TRANSMISSION UNIT

BACKGROUND OF THE INVENTION

The present invention relates to a transmission unit installed to a hybrid vehicle which is equipped with an internal combustion engine and an electric motor as a driving force generator.

Various types of hybrid vehicles have been proposed in order to respond to social demands in view of environmental protection and fuel economy. Most of the proposed hybrid vehicles are arranged to comprise an electric motor and an internal combustion engine as a motive power generator. When such a hybrid vehicle is produced, it is preferable to employ a conventional transmission without changing a basic layout in view of cost saving. For example, Japanese Patent Provisional Publication No. 9-329228 discloses a continuously variable transmission (CVT) arranged as shown in FIG. 12. This CVT is constituted by a torque converter chamber 101 defined by the first housing 113 and a first partition wall 116, a planetary gear chamber 102 defined by a second housing 114, the first partition wall 116 and a second partition wall 117, and a transmission chamber 103 defined by a third housing 115 and the second partition wall 117.

Rotational power of an engine is inputted to a torque converter 110 provided in the torque converter chamber 101. An output from the torque converter 110 is inputted into the planetary gear chamber 102 to changeover the rotational direction between the forward or reverse direction. Then, the power is inputted from the torque converter 110 to a transmission 112 of the transmission chamber 103. The transmission 112 comprises a belt-type CVT which transmits the output rotation of the planetary gear 111 through a driver pulley 112a and a belt 112c to a follower pulley 112b. The hydraulic pressure outputted from a control valve unit is supplied to an axial oil passage 123 of the driver pulley 112a through a case 120, an oil pump 121 and an input shaft 122. Further, the hydraulic pressure is supplied to a driver pulley cylinder chamber 124 of the driver pulley 112a to control a transmission ratio.

However, when such a conventional transmission unit for an engine-drive vehicle is adapted as that for a hybrid vehicle without changing the basic layout, it is first planed to put an electromagnetic clutch in the torque converter chamber 101 and a motor in the planetary gear chamber 102. In such a plan, it is necessary to locate the electromagnetic clutch and the motor in a dry chamber in which oil for control and lubrication is not entered. Further, a hybrid vehicle is put in a running state even when the engine is stopped. Therefore, it is necessary to provide an electric oil pump for supplying hydraulic pressure during such engine-stopped running state.

In other way, an electric oil pump may be installed outside of the transmission unit. For example, as disclosed in Japanese Patent Provisional Publication 10-205606, an electric oil pump may be installed outside of a housing of the transmission unit. However, if the electric oil pump is simply installed to the housing, the size of the transmission unit including the electric oil pump becomes large to degrade the installation on a vehicle.

SUMMARY OF THE INVENTION

It is therefore an object of the present invention to provide an improved transmission unit which maintains a basic layout of a conventional transmission unit and comprises an electric oil pump.

A transmission unit according to the present invention comprises a hydraulic control valve unit, a housing and an electric oil pump. The hydraulic control valve unit is disposed at a plane parallel to an axis of the transmission unit. The hydraulic control valve unit controls hydraulic pressure for controlling and lubricating a transmission mechanism. The housing has a depressed portion which is contacted with the hydraulic control valve unit, the transmission mechanism of the transmission unit and the hydraulic control valve unit is disposed in said housing. The electric oil pump is disposed on the depressed portion of said housing so that a part of the hydraulic control valve unit is overlapped with a part of the electric oil pump through the depressed portion.

DETAILED DESCRIPTION OF THE INVENTION

Referring to FIGS. 1 to 11, there is shown an embodiment of an automatic transmission unit according to the present invention.

Figure 1:
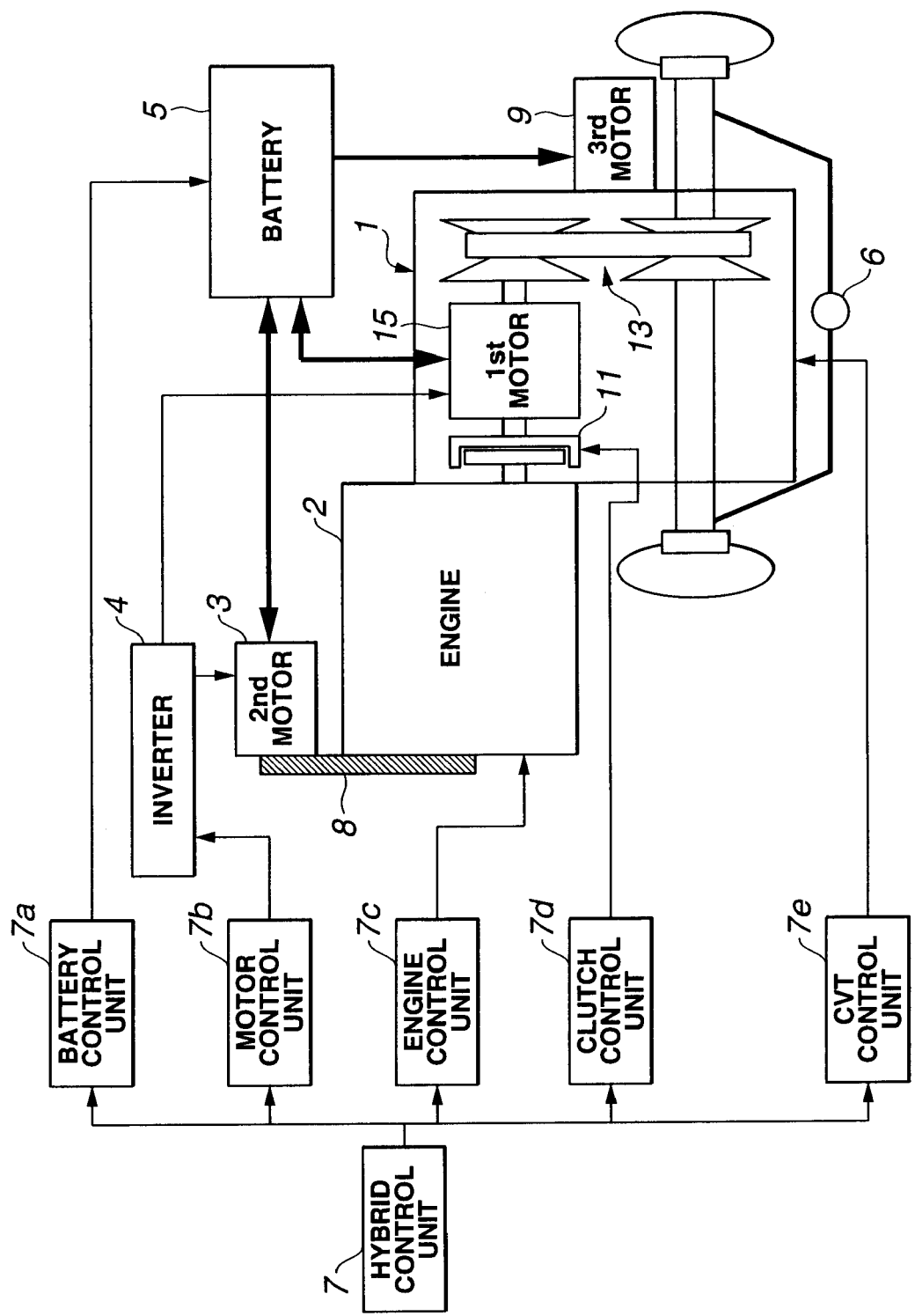
FIG. 1 is a schematic view showing a construction of major parts of a hybrid vehicle to which a transmission unit according to the present invention is employed.

As shown in FIG. 1, a drive system of a hybrid vehicle comprises a transmission unit 1, an internal combustion engine 2, a second motor 3 for generating electric power and starting the engine 2, an inverter 4, a battery 5, a power steering 6 of an electric drive type, a hybrid control unit 7, and a chain 8.

An electromagnetic clutch 11, a first motor 15 for driving the vehicle, and a continuously variable transmission (CVT) 13 are provided in the transmission unit 1. The first motor 15 also functions as a regeneration motor which operates during deceleration and braking of the vehicle. Further, a third motor 9 is provided in the transmission unit 1. Since the hybrid vehicle runs only by driving force of the first motor 15 in some cases, it is impossible under such a condition to ensure a desired hydraulic pressure such as a pulley pressure of the CVT 13 only by an oil pump driven by the engine 2. Therefore, the third motor 9 is provided. Further, due to the similar reason, an assist force of the power steering 6 is generated by the third motor 9.

The second motor 3 acting as a generator and an engine starter is mounted on an engine block of the engine 2 and is connected to the engine 2 by means of the chain 8. A battery 5, the first and second motors 15 and 3, the engine 2, the electromagnetic clutch 11 and the control units 7a, 7b, 7c, 7d and 7e of the CVT 13 are independently operated, and are integratedly controlled by the hybrid control unit 7.

Next, the manner of operation of the drive system of the hybrid vehicle will be discussed.

The hybrid vehicle shown in the embodiment according to the present invention is of a parallel type in which both the engine 2 and the first motor 15 drives the hybrid vehicle when the maximum power is needed. The first motor 15 acts as an assistant of the engine 2 which is designed to perform an economical mode prior to a power mode. The CVT 13 acts as an arranger of the engine 2 so that the engine 2 operates at the best economical state. The electromagnetic clutch 11 is of an electromagnetic type, and if the electromagnetic clutch 11 is turned off, the engine 2 is released from the first motor 15. Therefore, the hybrid vehicle is driven only by the first motor 15 during this clutch released condition. The clutch control unit 7d is arranged to receive the control command from the hybrid control unit 7 and automatically and optimally controls the turn on and off of the electromagnetic clutch 11.

System Start

When the drive system of the vehicle starts, the second motor 3 acts as a starter to start the engine 2.

During Run-start or Low-speed Running

When the vehicle starts running or runs at low-speed where the fuel consumption of the engine 2 is low in efficiency, the engine 2 is stopped and the vehicle runs only by the power of the first motor 15. Even during the run-start or the low-speed running, when the load to the vehicle is high, that is, when the throttle opening is set large, the engine 2 is immediately started and the electromagnetic clutch 11 is turned on so that the vehicle runs by the power of the engine 2 and the first motor 15.

During Normal Running

During the normal running, the vehicle runs by means of the engine 2 mainly. The CVT 13 controls the rotation speed of the engine 2 so as to execute the engine operation along an optimum fuel-consumption curve.

During High Load Condition

When the vehicle is put in the high load condition where it is necessary to generate a further power in addition to the maximum power of the engine 2, the first motor 15 generates the further power by aggressively receiving electric power from the battery 5.

During Deceleration

When the vehicle is decelerated, the fuel supply to the engine 2 is cut. Simultaneously, the first motor 15 acts as a generator to convert the kinetic energy of the braking into electric energy and to store it in the battery 5.

During Reverse Running

Since the CVT 13 is not provided with a reverse gear, the electromagnetic clutch 11 is released and the first motor 15 is inversely rotated to run the vehicle backward only by means of the first motor 15.

During Stopping Condition

When the vehicle is stopping, the engine 2 is basically stopped. When the battery requires charging or when the air-conditioner operates, the engine 2 is not stopped.

Figure 2:
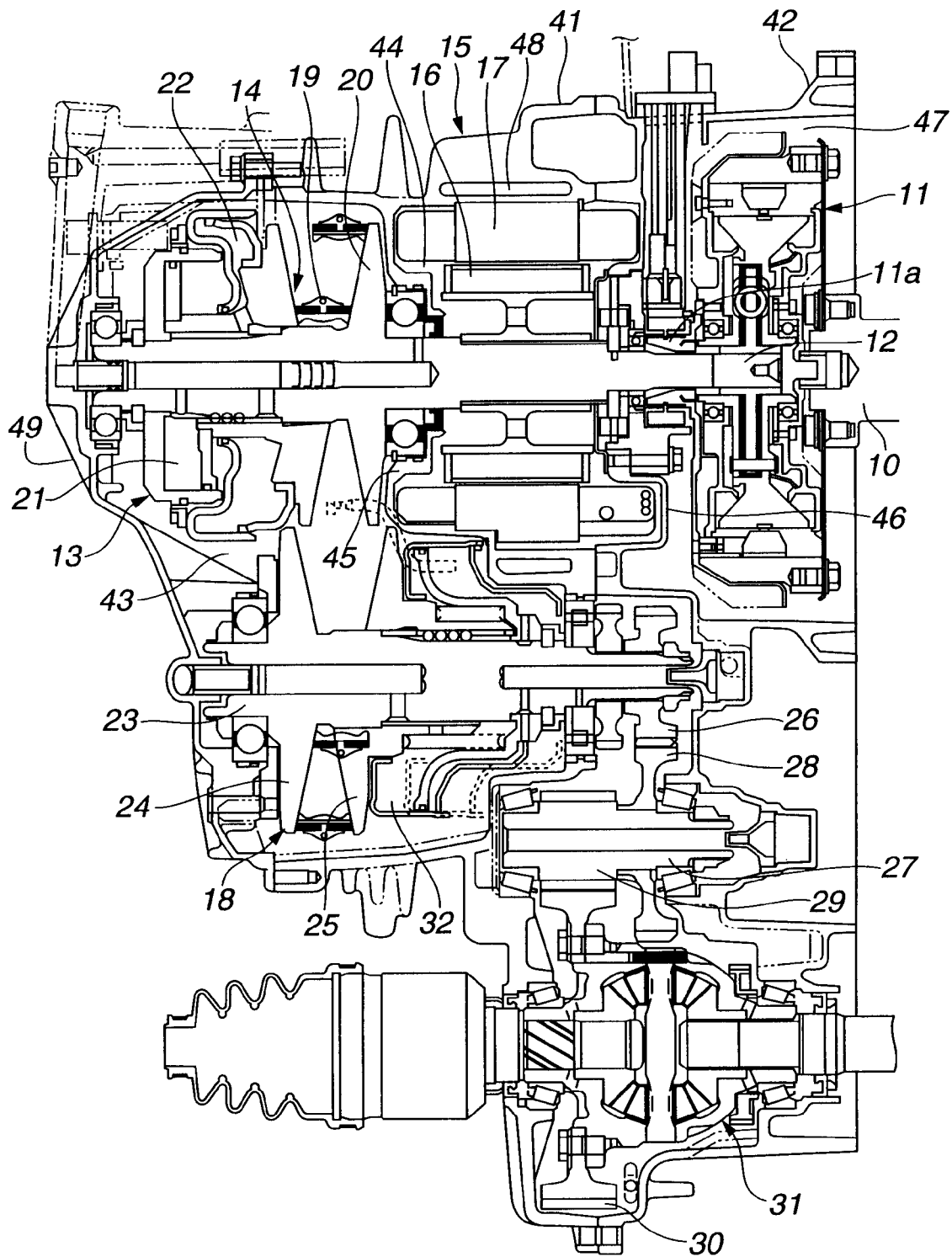
FIG. 2 is a cross sectional view showing the transmission unit including a belt type continuously variable transmission.

FIG. 2 shows the transmission unit 1 including the belt-type CVT 13 in accordance with the present invention. An engine output shaft 10 is connected to an input side of the electromagnetic clutch 11. A slip ring 11a for supplying electric power to the electromagnetic clutch 11 is installed to the electromagnetic clutch 11. An output side of the electromagnetic clutch 11 is connected to a transmission input shaft 12. A driver pulley 14 of the CVT 13 is provided at an end portion of the transmission input shaft 12. The first motor 15 is provided around the transmission input shaft 12 so as to be located between the electromagnetic clutch 11 and the driver pulley 14.

The first motor 15 comprises a rotor 16 fixed to the transmission input shaft 12 and a stator 17 fixed to a second housing 41. The first motor 15 rotates the transmission input shaft 12 by receiving the electric power from the battery 5 and acts as a generator during the deceleration of the vehicle.

The CVT 13 comprises the driver pulley 14 and a follower pulley 18 and a belt 19 for transmitting the rotation force form the driver pulley 14 to the follower pulley 18. The driver pulley 14 comprises a fixed cone disc 20 and a movable cone disc 22. The fixed cone disc 20 is integral with the transmission input shaft 12 and thereby rotating integrally with the input shaft 12. The movable cone disc 22 is disposed opposite to the fixed cone disc 20 so as to form a V-shaped groove for the belt 19. The movable cone disc 22 is connected to the fixed disc 20 so as to be movable along an axial direction of the input shaft according to a hydraulic pressure applied to a driver pulley cylinder chamber 21. The follower pulley 18 is provided on a follower shaft 23. The follow pulley 18 comprises a fixed cone disc 24 and a movable cone disc 25. The fixed cone disc 24 is integral with the follower shaft 23 and thereby rotating integrally with the follower shaft 23. The movable cone disc 25 is disposed opposite to the fixed cone disc 24 so as to form a V-shaped groove for the belt 19. The movable cone disc 25 is connected to the fixed disc 24 so as to be movable along an axial direction of the follower shaft 23 according to a hydraulic pressure applied to a follower pulley cylinder chamber 32.

A drive gear 26 is fixed to the follower shaft 23 and is meshed with an idler gear 28. A pinion 29 is integrally installed on an idler shaft 27 and is meshed with a final gear 30. The final gear 30 drives a drive shaft connected to a drive shaft through a differential device 31.

The rotational force inputted from the engine output shaft 10 is transmitted to the CVT 13 through the electromagnetic clutch 11 and the transmission input shaft 12. The rotational force of the input shaft 12 is transmitted to the differential device 31 through the driver pulley 14, the belt 19, the follower pulley 19, the follower shaft 23, the drive gear 26, the idler gear 28, the idler shaft 27, the pinion 29 and the final gear 30.

When the driving force is transmitted as mentioned above, the movable cone disc 22 of the driver pulley 14 and the movable cone disc 25 of the follower pulley 18 are moved in the axial direction to vary respective contact-position radiuses to the belt 19 to vary a rotation ratio between the driver pulley 14 and the follower pulley 18, that is, a transmission ratio. This control for varying the widths of the V-shaped grooves of the driver pulley 14 and the follower pulley 18 is executed by the hydraulic control to the driver pulley cylinder chamber 21 and the follower pulley cylinder chamber 32.

The second housing 41 encloses the CVT 13 and the first motor 15, and a first housing 42 encloses the electromagnetic clutch 11. The second and first housings 41 and 42 constitute a transmission housing of the transmission unit. The first and second housings 42 and 41 are connected on a plane generally perpendicular to the axis of the transmission input shaft 12. The second housing 41 is partitioned into a transmission chamber 43 for the CVT 13 and a motor chamber 44 for the first motor 15 by a second partition wall 45.

A first partition wall 46 is provided at an end portion of the first housing 42 which end portion is connected to the second housing 41. Therefore, when the second and first housings 41 and 42 are connected with each other, the motor chamber 44 is defined between the second and first partition walls 45 and 46. Further, when the other end portion of the first housing 42 is connected to the engine 2, the clutch chamber 47 is defined between the first partition wall 46 and the engine 2.

The stator 17 of the first motor 15 is assembled to the motor chamber 44 by means of shrinkage fit. The arrangement simplifies the structure of the transmission unit 1. Further, it becomes possible to provide a water jacket 48 around the stator 17 in the first housing 42 and to effectively cool the first motor 15 by circulating coolant in the water jacket 48.

Figure 3:
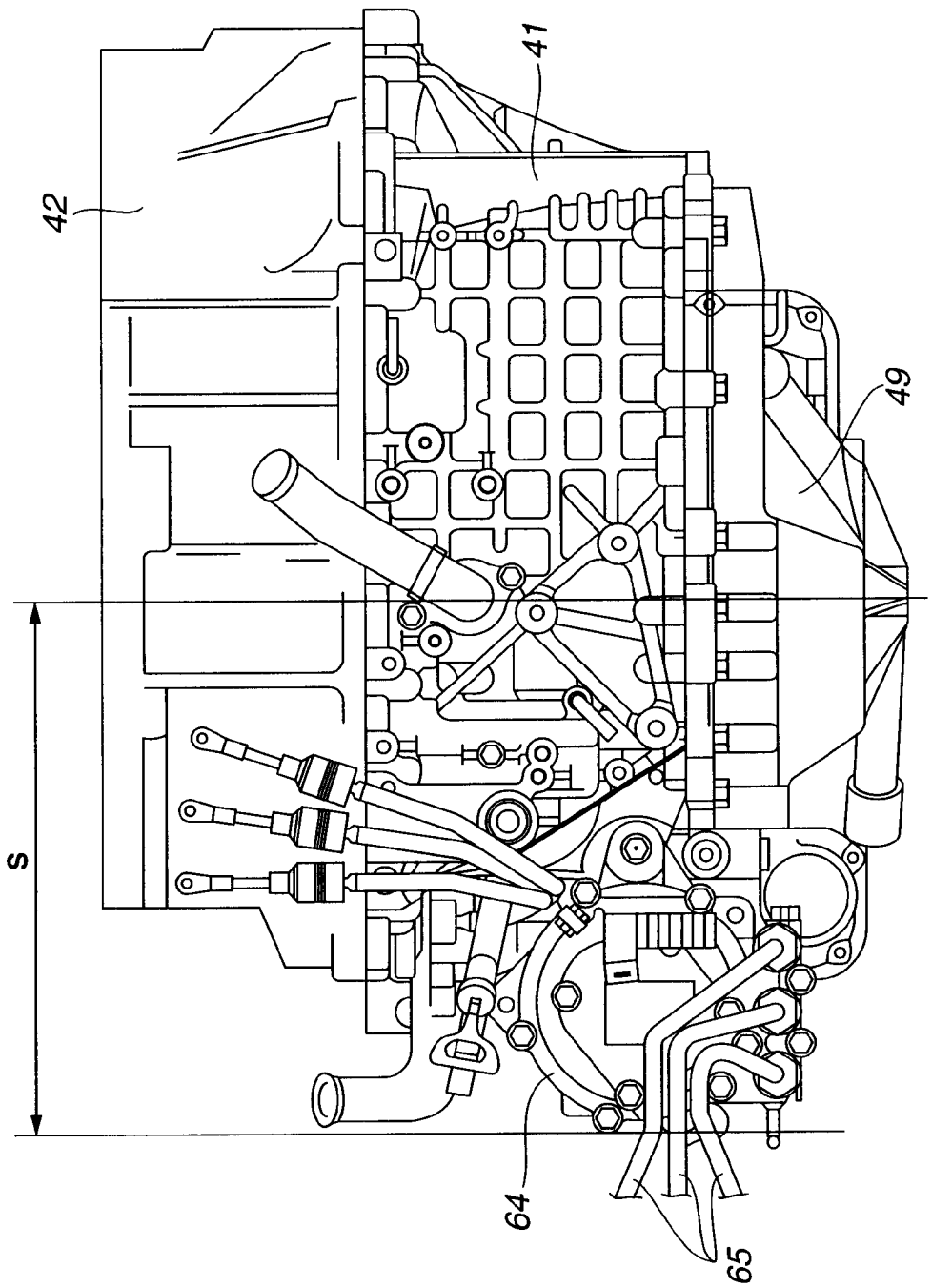
FIG. 3 is a top view of the transmission unit according to the present invention.
Figure 4:
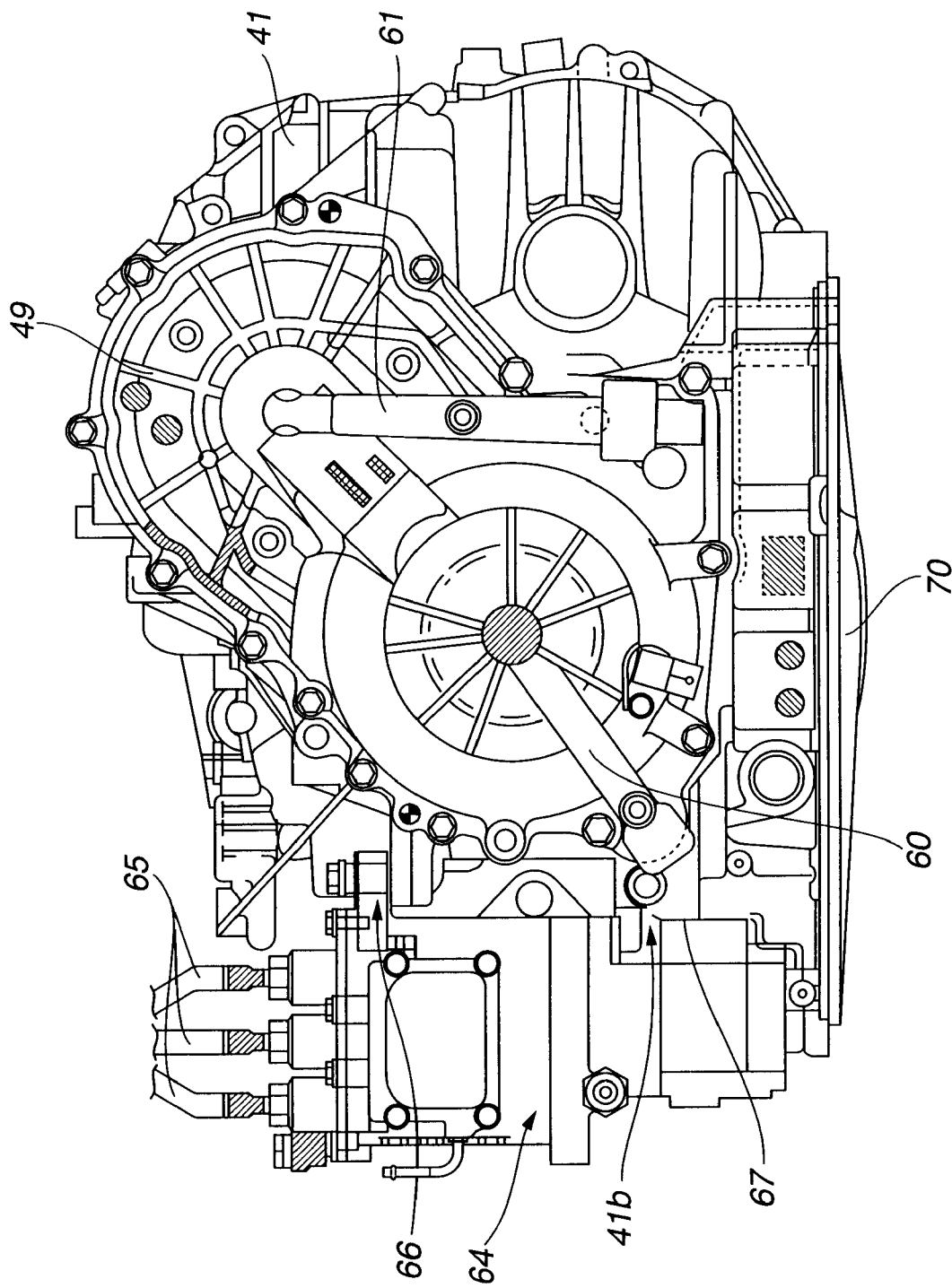
FIG. 4 is a front view of the transmission unit according to the present invention.
Figure 7:
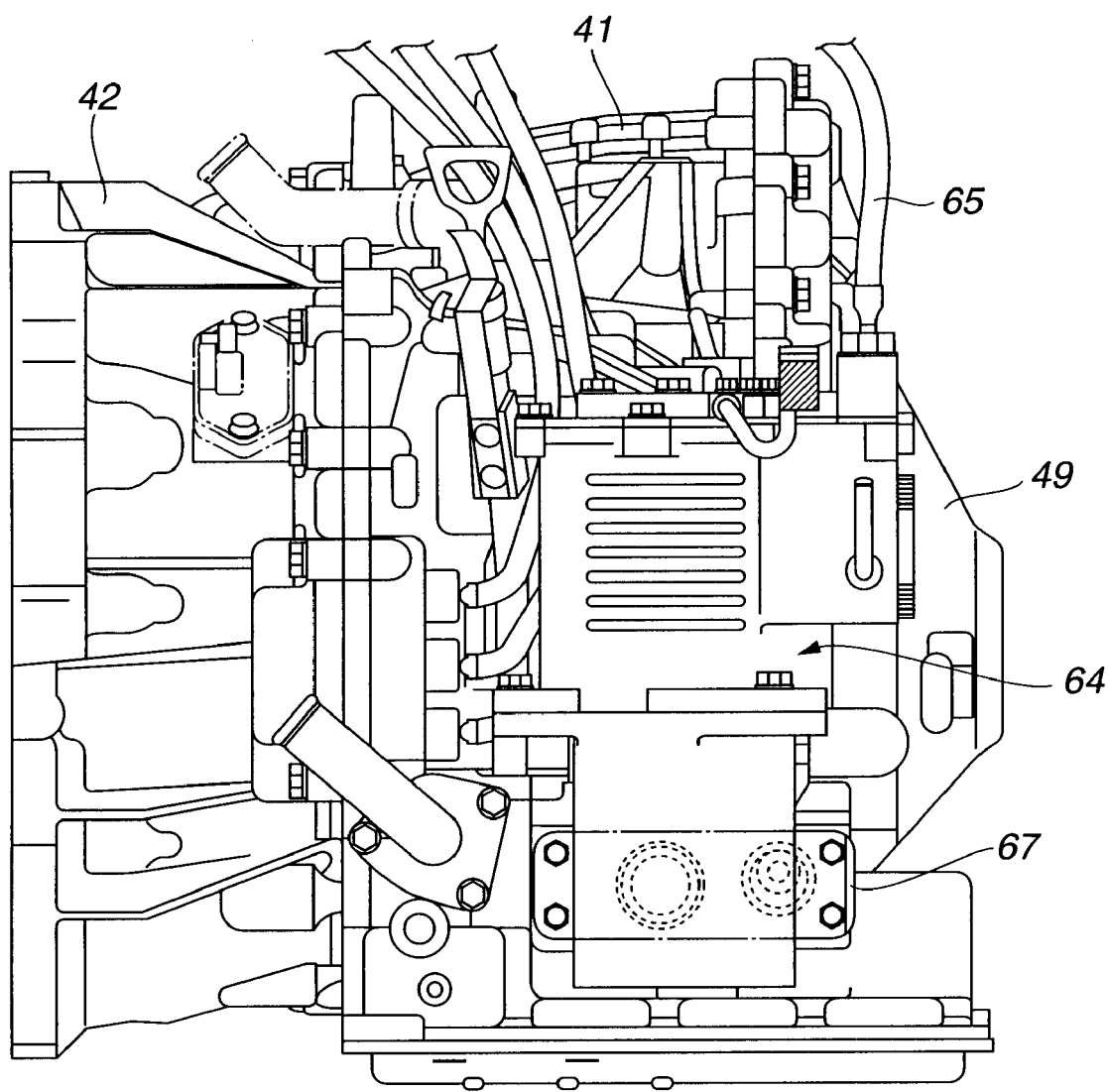
FIG. 7 is a side view of the transmission unit.

FIGS. 3, 4 and 7 show an external appearance of the transmission unit 1 provided with an electric oil pump 64. The third motor 9 is provided in the electric oil pump 64 so that a necessary hydraulic pressure can be supplied even when the engine 2 is stopping. A harness 65 for supplying three-phase electric current to the third motor 9 is provided at an upper surface of the electric oil pump 64 as shown in FIG. 4.

Figure 5:
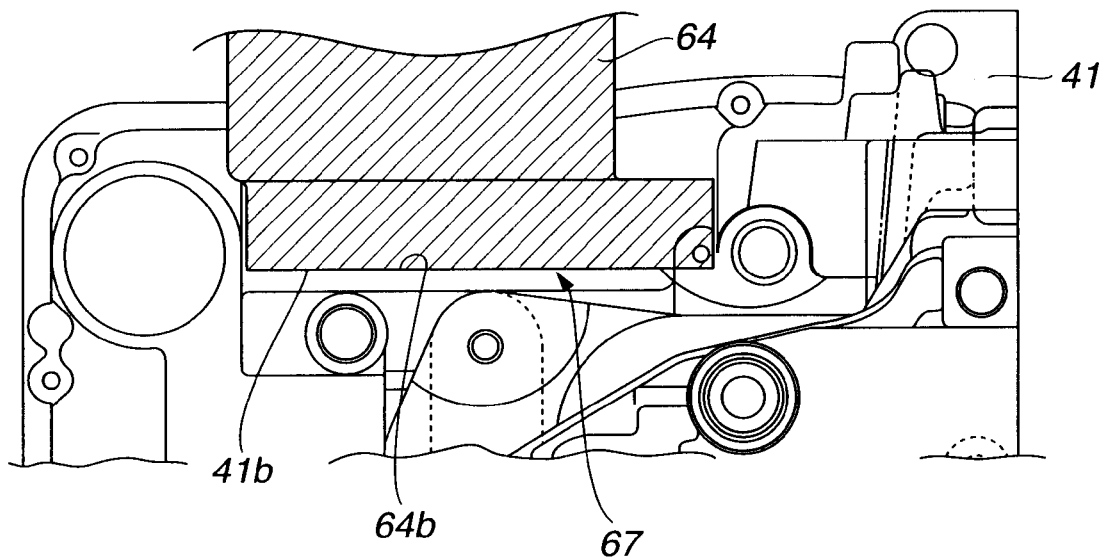
FIG. 5 is an enlarged view showing a connecting portion between a second housing and an electric oil pump.

FIG. 5 shows a connecting portion 67 between the electric oil pump 64 and the second housing 41. A low-pressure inlet port 86 and a high-pressure outlet port 87 of the electric oil pump 64 are provided at a connecting surface 64b of the connecting portion 67 and are connected to a depressed portion 41b of the second housing 41. The depressed portion 41b of the second housing 41 is fittingly and fixedly connected to the connecting surface 64b so that a longitudinal dimension S shown in FIG. 3 is suppressed at minimum. This arrangement prevents the transmission unit 1 from degrading in an easiness of equipping it on the vehicle.

A first oil passage 60 for supplying hydraulic pressure to the driver pulley 14 and a second oil passage 61 for supplying hydraulic pressure to the follower pulley 18 are disposed at an outside portion of a third housing 49. The first and second oil passages 60 and 61 are integrally formed with the third housing 49 as clearly shown in FIG. 4. The hydraulic pressure generated at a control valve unit 70 is supplied to a driver pulley supporting portion 62 and a follower pulley supporting portion 63 through the first and second oil passages 60 and 61.

Figure 6:
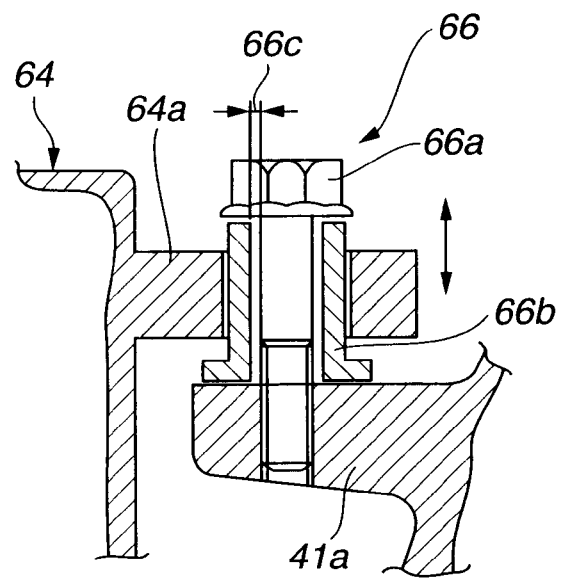
FIG. 6 is an enlarged view showing a tolerance absorb supporting portion.

A tolerance-absorb supporting portion 66 for absorbing an installation tolerance between the electric oil pump 64 and the second housing 41 is installed at an upper portion of the electric oil pump 64 as shown in FIG. 4. FIG. 6 shows an enlarged view of the tolerance-absorb supporting portion 66 constituted by a pump supporting portion 64a, a housing connecting portion 41a and a bolt 66a. As shown in FIG. 6, the pump supporting portion 64a projecting from the electric oil pump 64 is interconnected with the housing connecting portion 41a of the second housing 41 by means of the bolt 66a. A bush 66b is provided between the pump supporting portion 64a and the bolt 66a so as to be slidably movable in the axial direction of the bolt 66a. A clearance 66c is formed between the bush 66b and the bolt 66a. This arrangement is capable of absorbing the vertical and horizontal tolerances generated when the pump supporting portion 64a of the oil pump 64 is installed to the second housing 41 and prevents the oil pump 64 from inclining with respect to the second housing 41.

Figure 8:
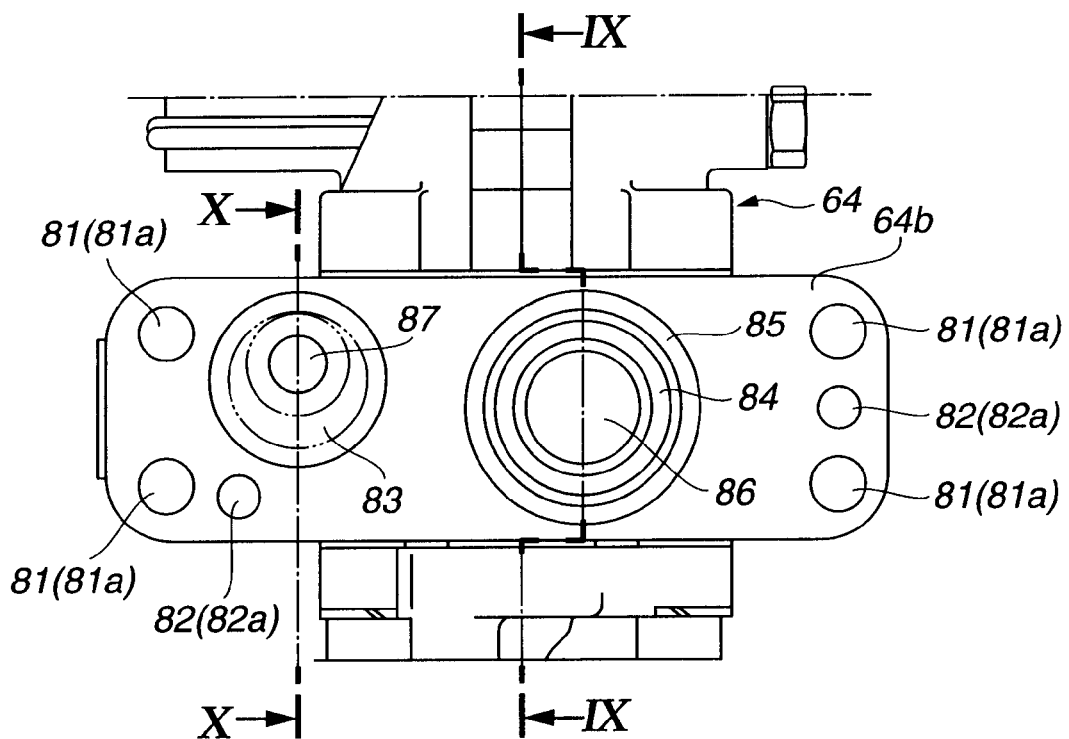
FIG. 8 is a front view showing a connecting surface of the electric oil pump.

FIG. 8 shows a connecting surface 64b of the electric oil pump 64. The connecting surface 64b has four bolt holes 81 through which fixing bolts 81a are screwed to the second housing 41 so as to fix the oil pump 64 in the direction perpendicular to the connecting surface 64b. Further, the connecting surface 64b has two pin holes 82 to which two knock pins 82a are embedded to fix the oil pump 64 to the second housing 41 in the direction along the connecting surface 64b. That is, the connecting surface 64b is rigidly connected to the second housing 41 by means of the fixing bolts 81a and the knock pins 82a. First and second O-ring grooves 84 and 85 are formed at an outer periphery of a low-pressure outlet port 86 on the connecting surface 64b. Accordingly, the double sealing structure is constructed by installing two O-rings to the first and second O-ring grooves 84 and 85 and seals the low-pressure outlet port 86.

A circular depressed portion 83 is formed at a left side of the low-pressure inlet port 86 as shown in FIG. 8. A high-pressure outlet port 87 is provided in the circular depressed portion 83 so as to be located at an upper portion of the circular depressed portion 83 as shown in FIG. 8. An O-ring 83a is installed at an inner periphery of the circular depressed portion 83.

Figure 9:
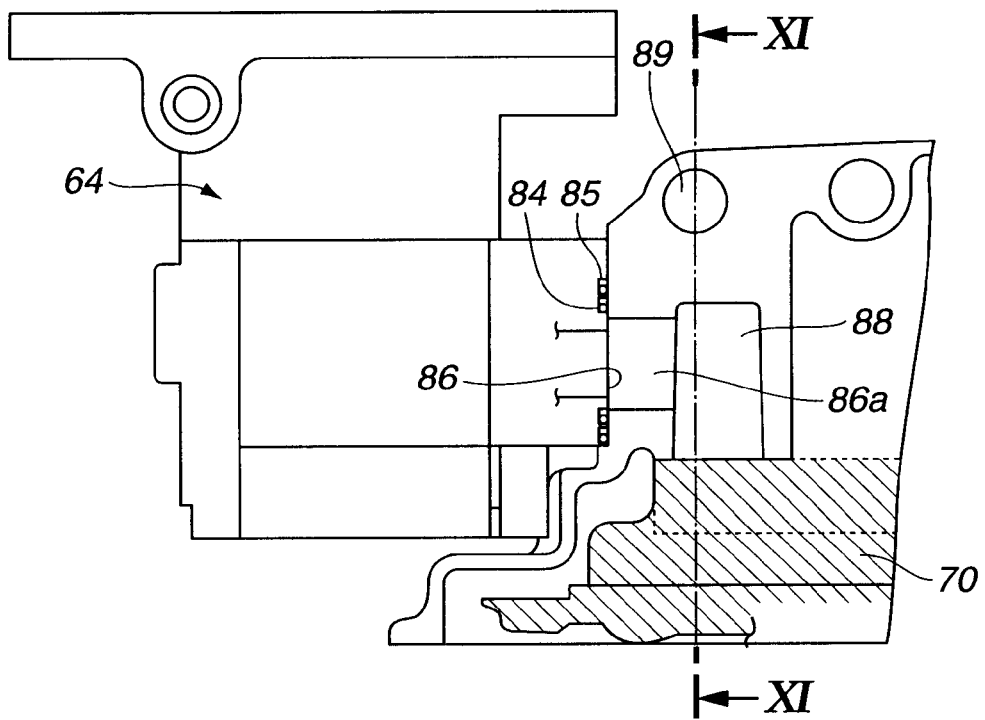
FIG. 9 is a cross sectional view taken in the direction of arrows substantially along the line IX—IX of FIG. 8.

FIG. 9 shows the low pressure inlet port 86. The oil in the control valve unit 70 is delivered through a first oil passage 88 and a second oil passage 86a of the second housing 41 to the low-pressure inlet port 86 of the electric oil pump 64. Since the low-pressure inlet port 86 and the first oil passage 88 are located through a partition wall of the second housing 41, it is possible to shorten the second oil passage 86a which is formed in the partition wall. This shortening of longitudinal dimension of the oil passage decreases the flow resistance of the oil in the inlet passage.

Figure 10:
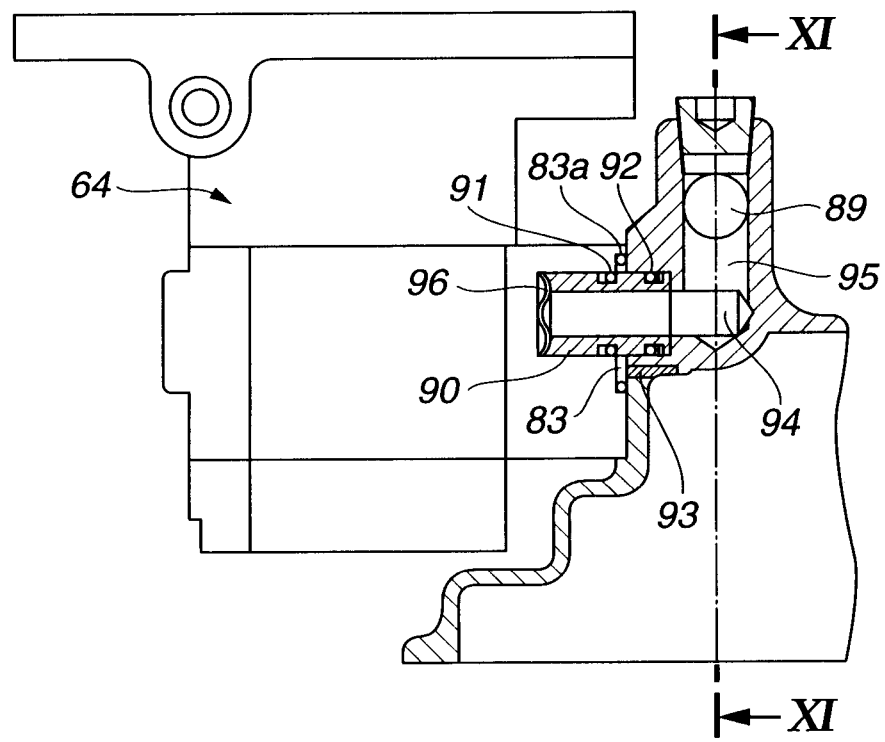
FIG. 10 is a cross sectional view taken in the direction of arrows substantially along the line X—X of FIG. 8.

FIG. 10 shows the high-pressure outlet port 87. A part of a sleeve 90 is inserted to the high-pressure outlet port 87 of the electric oil pump 64 through an O-ring 91, and the other part of the sleeve 90 is inserted to second housing 41 through an O-ring 92. A disc spring 96 is provided between an end of the sleeve 90 inserted in the high-pressure outlet port 87 and a bottom end of the high-pressure outlet port 87 to prevent the sleeve 90 from generating oil leakage caused by the pumping of the sleeve 90. An oil drain passage 93 is provided at a position which is formed on the connecting surface of the second housing 41 facing with the annular depressed portion 83 but is offset from the center of the sleeve 90. The oil is discharged from the high-pressure outlet port 87 and is delivered through a first oil passage 94 to a second oil passage 95 and a third oil passage 89 of the second housing 41.

The oil discharged from the electric oil pump 64 is high in pressure, and the transmission unit 1 vibrates itself. Therefore, there is a possibility that oil leaks through the O-rings 91 and 92. However, if oil leaks through the O-rings 91 and 92, the oil becomes low in pressure and flows out to the circular depressed portion 83. The leaked oil is then drained through a drain passage 93 of the second housing 41 into the transmission unit 1. This prevents the oil from leaking out to the exterior of the transmission unit 1. Although there is a possibility that a clearance is formed between the sleeve 90 and the bottom end of the high-pressure outlet port 87 due to the machining tolerance of the depth of the hole for the sleeve 90 at the connecting portion 67 between the electric oil pump 64 and the second housing 41, by providing the disc spring 96 between the sleeve 90 and the bottom end of the high-pressure outlet port 87, the vibration due to the pulsation flow from the electric oil pump 64 is suppressed, and therefore it becomes possible to prevent the oil leakage caused by the pumping of the sleeve 90.

Figure 11:
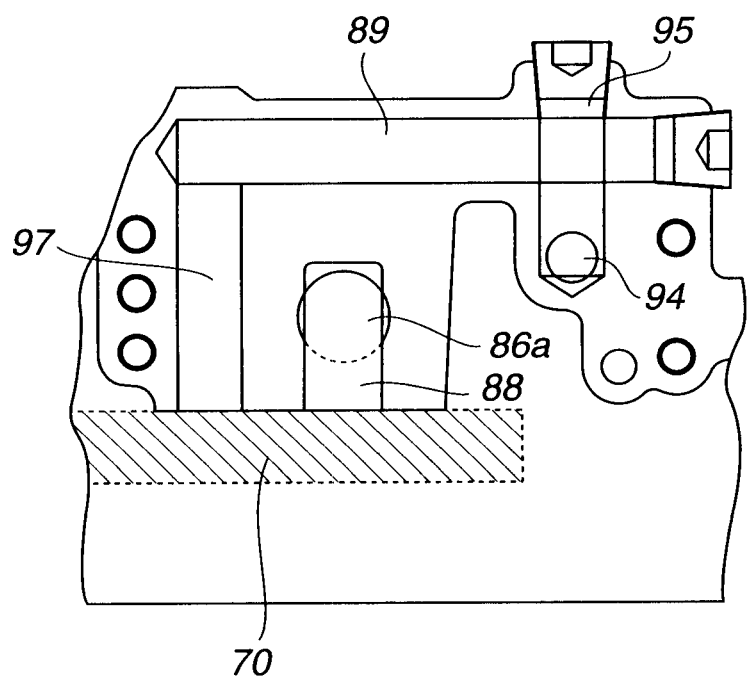
FIG. 11 is a cross sectional view taken in the direction of arrows substantially along the line XI—XI of FIG. 8.
Figure 12:
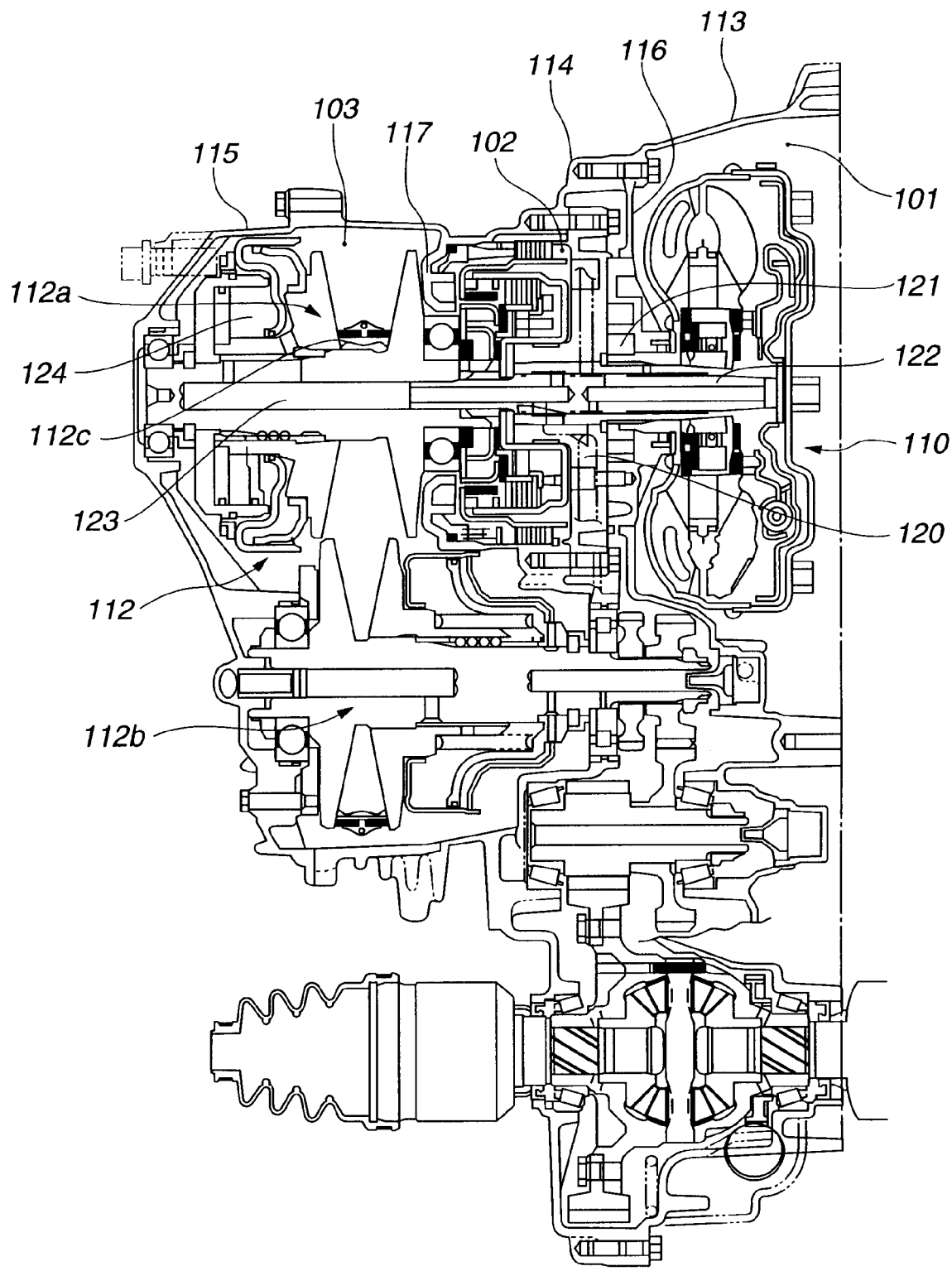
FIG. 12 is a cross sectional view showing a conventional transmission unit.

FIG. 11 shows the low-pressure oil passage and a high-pressure oil passage of the second housing 41. The electric oil pump 64 draws the oil in the control valve unit 70 through the first oil passage 88 and the second oil passage 86a. The electric oil pump 64 supplies the pressurized oil through the first oil passage 94, the second oil passage 95, the third oil passage 89 and the fourth oil passage 97 to the control valve unit 70.

As explained above, the transmission unit 1 of the hybrid vehicle according to the embodiment of the present invention has to be constructed as small as possible so as to be installed to a vehicle body for a conventional vehicle, which is driven only by an internal combustion engine, without specifically changing the vehicle body. Therefore, the electric oil pump 64 is installed to the exterior of the transmission unit 1 so that the electric oil pump 64 is installed at the depressed portion 41b of the second housing 41 so as to partially overlap with a part of the control valve unit 70. This arrangement enables the transmission unit 1 for the hybrid vehicle to become compact in size.

Since the control valve unit 70 is installed under the transmission unit 1, the electric oil pump 64 and the control valve unit 70 are overlapped in the direction of the cylindrical axis by providing the connecting surface 64b of the electric oil pump 64 just under the partition wall of the connecting portion of the second housing 41. The connecting surface 64b has the low-pressure inlet port 86 and the high-pressure outlet port 87 of the oil pump 64. This arrangement enables the longitudinal dimensions of the inlet oil passage and the outlet oil passage to be shortened and the flow resistance thereof to be decreased.

The knock pins 82a are installed to restrict the sliding motion of the oil pump connecting surface along the connecting surface, and the fixing bolts 81a are tightened to restrict the motion at the connecting portion between the electric oil pump 64 and the second housing 41 in the direction perpendicular to the connecting surface. These arrangements establish the fixed and rigid connection between the electric oil pump 64 and the second housing 41. Further, the tolerance-absorb supporting portion 66, which acts to absorb the installation tolerance of the electric oil pump 64 with respect to the second housing 41, is installed at the upper portion of the electric oil pump 64. That is, since a transmission unit is connected to an engine, the vibrations of the engine directly affect the transmission unit. Therefore, if the electric oil pump and the second housing 41 are connected only by means of bolts, the connecting surface of the electric oil pump 64 moves relative to the connecting surface of the second housing 41 due to the relatively large tolerance of the bolt holes. This may generate oil leak. In contrast to this, the transmission unit 1 according to the present invention is arranged to install knock pins 82a. Therefore, the electric oil pump 64 and the second housing 41 are fixedly connected at the connecting surfaces 64b and 41b so as to prevent the connecting surfaces 64b and 41b from generating the offset due to the vibration of the engine 2. Further, since the O-rings 91 and 92 installed in the sleeve 90 is properly depressed and kept at a proper depressed state, the oil leak is further firmly prevented. Although the provision of the knock pins 82a decreases the easiness as to the installation of the electric oil pump 64 to other supporting portions, the provision of the tolerance-absorb supporting portion 66 enables absorbing the tolerance and preventing the inclined installation of the electric oil pump 64 to the second housing 41.

Furthermore, the O-ring grooves 84 and 85 are provided at the connecting surface 64b of the electric oil pump 64 so as to be coaxial with the low-pressure inlet port 86, and the two O-rings are provided in the O-ring grooves 84 and 85, respectively. Therefore, the low-pressure inlet port 86 is firmly sealed so that the oil leak between the electric oil pump 64 and the second housing 41 is firmly prevented.

The entire contents of Japanese Patent Application No. 2000-79553 filed on Mar. 22, 2000in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A transmission unit comprising:
   a transmission mechanism;
   a hydraulic control valve unit for controlling said transmission mechanism, said hydraulic control valve unit being disposed on a plane parallel to an axis of said transmission mechanism;
   a housing enclosing said transmission mechanism, said housing having a depressed portion which is overlapped with said hydraulic control valve unit installed to said housing; and
   an electric oil pump disposed on the depressed portion outside of said housing so that a part of said hydraulic control valve unit is overlapped with a part of said electric oil pump.

2. The transmission unit as claimed in claim 1, which is adapted to a hybrid vehicle.

3. The transmission unit as claimed in claim 1, wherein said electric oil pump pressurizes oil supplied from said hydraulic control valve unit and supplies the pressurized oil to said hydraulic control valve unit.

4. The transmission unit as claimed in claim 1, wherein said hydraulic control valve unit is located at a lowermost position when the transmission unit is installed to a vehicle, the depressed portion being located above the plane on which said hydraulic control valve unit is disposed, said electric oil pump being located above said hydraulic control valve unit so as to partially overlap with each other when the transmission unit is installed to the vehicle.

5. The transmission unit as claimed in claim 1, wherein the transmission unit comprises an electric motor, the electric motor working in cooperation with an internal combustion engine as a driving force generator.

6. A transmission unit comprising:
   a transmission mechanism;
   a hydraulic control valve unit for controlling said transmission mechanism, said hydraulic control valve unit being disposed on a plane parallel to an axis of said transmission mechanism;

a housing enclosing said transmission mechanism, said housing having a depressed portion which is overlapped with said hydraulic control valve unit installed to said housing; and an electric oil pump disposed on the depressed portion of said housing so that a part of said hydraulic control valve unit is overlapped with a part of said electric oil pump, wherein an end portion of said electric oil pump is connected to the depressed portion of said housing, the end portion of said electric oil pump has a low-pressure oil inlet port for sucking oil from the hydraulic control valve unit and a high-pressure outlet port for delivering pressurized oil to the hydraulic control valve unit.

7. The transmission unit as claimed in claim 6, wherein a housing oil outlet port connected to the low-pressure oil inlet port of the electric oil pump is provided just under a partition wall defining the depressed portion.

8. A transmission unit comprising:

a transmission mechanism;

a hydraulic control valve unit for controlling said transmission mechanism, said hydraulic control valve unit being disposed on a plane parallel to an axis of said transmission mechanism;

a housing enclosing said transmission mechanism, said housing having a depressed portion which is overlapped with said hydraulic control valve unit installed to said housing; and an electric oil pump disposed on the depressed portion of said housing so that a part of said hydraulic control valve unit is overlapped with a part of said electric oil pump, wherein the end portion of said electric oil pump is fixedly connected to the depressed portion of said housing by means of a knock pin for forbidding a motion between the connecting portions in a direction along a connecting surface between said electric oil pump and said housing and a bolt for forbidding a motion between the connecting portions in the direction perpendicular to the connecting surface.

9. The transmission unit as claimed in claim 8, wherein said electric oil pump has a tolerance absorbing supporting portion which is connected to said housing so as to absorb an installation tolerance while preventing said electric oil pump from being inclinedly installed to said housing, the tolerance absorbing supporting portion being located near another end portion opposite to the end portion connected to the depressed portion of said housing.

10. The transmission unit as claimed in claim 6, wherein the end portion is located at a lower side of said oil pump and the tolerance absorbing supporting portion is located at an upper side of said oil pump when the transmission unit is installed to a vehicle.

11. A transmission unit comprising:

a transmission mechanism;

a hydraulic control valve unit for controlling said transmission mechanism, said hydraulic control valve unit being disposed on a plane parallel to an axis of said transmission mechanism;

a housing enclosing said transmission mechanism, said housing having a depressed portion which is overlapped with said hydraulic control valve unit installed to said housing; and an electric oil pump disposed on the depressed portion of said housing so that a part of said hydraulic control valve unit is overlapped with a part of said electric oil pump, wherein a sleeve is inserted to the high-pressure outlet port of said electric oil pump and to an oil inlet portion of said housing, O-rings being sealingly provided between the sleeve and the high-pressure outlet port and between the sleeve and the oil inlet port of said housing, respectively.

12. The transmission unit as claimed in claim 11, wherein a disc spring is disposed between a bottom end portion of the high-pressure outlet port and an end of the sleeve.

13. The transmission unit as claimed in claim 11, wherein a circular depressed portion is provided at the high-pressure outlet port so that a center of the circular depressed portion is offset from a center of the sleeve, an O-ring being installed to the circular depressed portion, a drain passage being provided to said housing so as to be offset from the sleeve.

14. The transmission unit as claimed in claim 13, wherein the center of the circular depressed portion is offset from a center of the sleeve toward a tip end of the end portion of said electric oil pump so that a space defined by the circular depressed portion and the depressed portion of said housing is located below the sleeve when the transmission unit is installed to a vehicle.

15. A continuously variable transmission (CVT) unit for a hybrid vehicle, said CVT unit comprising:

a CVT mechanism comprising
an input shaft,
an electromagnetic clutch selectively connecting and disconnecting said input shaft and an engine of the hybrid vehicle,
a driver pulley installed to said input shaft,
a follower pulley installed to a shaft interconnected to wheels of the vehicle,
a belt connecting said driver pulley and said follower pulley to transmit driving power from said driver pulley to said follower pulley;

an electric motor installed around the input shaft and between the electromagnetic clutch and the driver pulley;

a hydraulic control valve unit disposed at a plane parallel to said input shaft, said hydraulic control valve unit controlling hydraulic pressure for controlling and lubricating said CVT mechanism;

a housing enclosing said CVT mechanism, said housing having a depressed portion which is overlapped with said hydraulic control unit installed to said housing; and an electric oil pump disposed on the depressed portion of said housing so that a part of the hydraulic control valve unit is overlapped with a part of said electric oil pump through the depressed portion.

* * * * *